United States Patent
Ehrlich

[15] 3,681,883
[45] Aug. 8, 1972

[54] TRAILER AND CHANNELED FLOOR ASSEMBLY THEREWITH

[72] Inventor: Donald J. Ehrlich, P.O. Box 446, Monon, Ind. 47959

[22] Filed: Sept. 28, 1970

[21] Appl. No.: 76,156

[52] U.S. Cl. ..........................52/220, 52/495, 52/593
[51] Int. Cl. ..............................................E04b 5/48
[58] Field of Search..........52/220, 221, 27, 592, 569, 52/492, 731, 495, 593, 541

[56] References Cited

UNITED STATES PATENTS

| | | | |
|---|---|---|---|
| 3,163,461 | 12/1964 | Troy | 52/495 X |
| 3,166,631 | 1/1965 | Reiland | 52/221 X |
| 3,093,935 | 6/1963 | Dunn | 52/593 X |
| 3,016,998 | 1/1962 | Buchmeier | 52/495 X |

*Primary Examiner*—Price C. Faw, Jr.
*Attorney*—Olson, Trexler, Wolters & Bushnell

[57] ABSTRACT

A floor assembly for use in a trailer or other such vehicle, which utilizes various cables and hoses, is disclosed herein and generally comprises first and second laterally spaced floor sections, each of which is constructed of a plurality of interfitting standard elongated shiplap boards, and an elongated housing formed to interfit between and to the floor sections for defining a channel which is adapted to receive the aforementioned cables.

8 Claims, 4 Drawing Figures

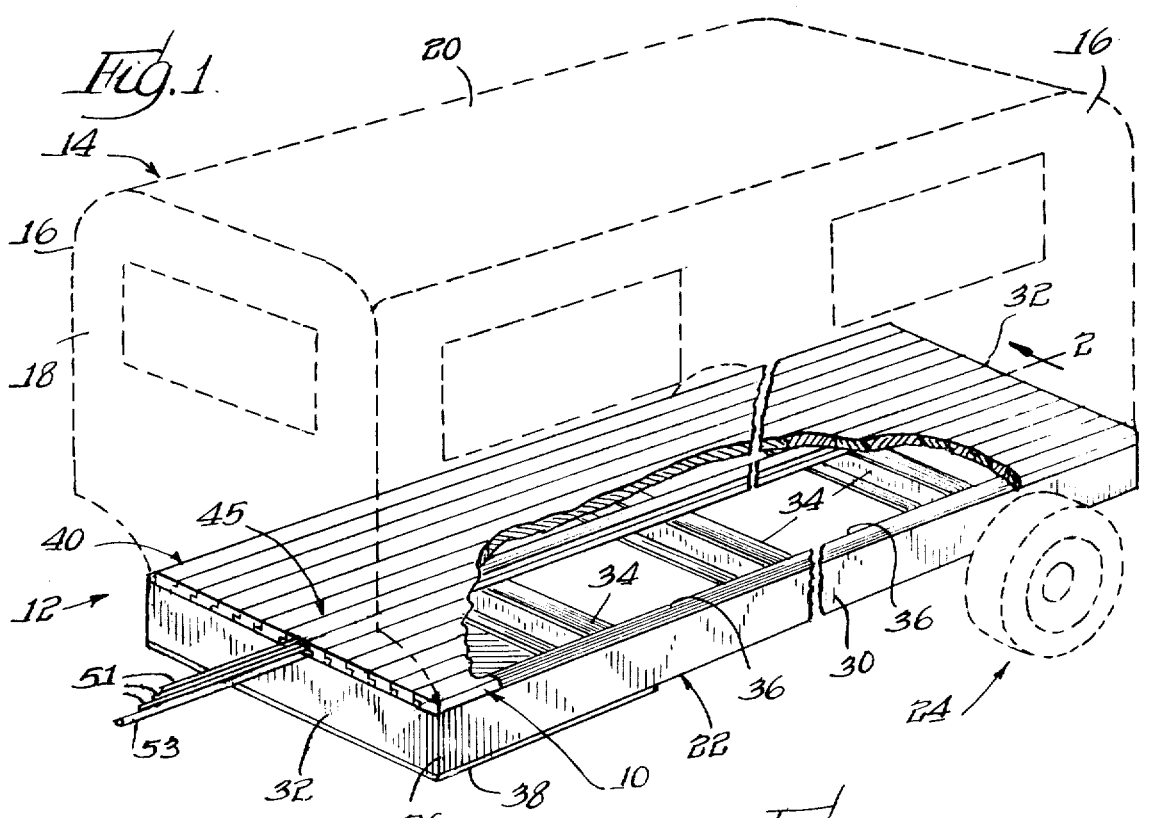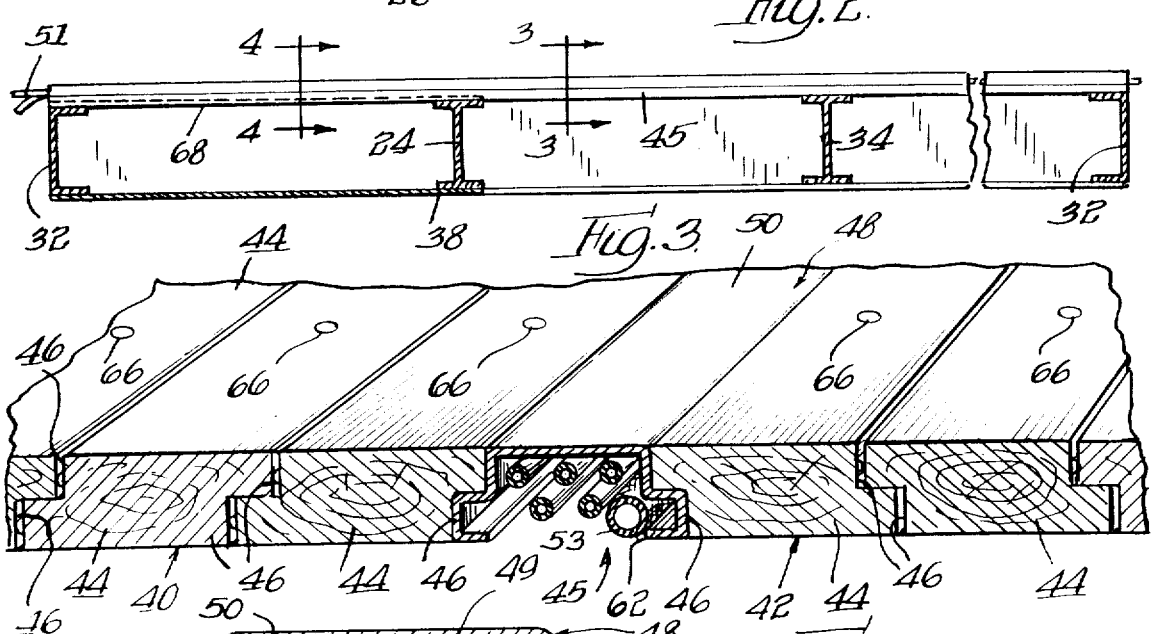

TRAILER AND CHANNELED FLOOR ASSEMBLY THEREWITH

SUMMARY OF THE INVENTION

This invention relates generally to floor assemblies, and more particularly to floor assemblies used with trailers or other such cable and hose carrying vehicles.

DISTINCTION OVER THE PRIOR ART AND OBJECTS

Trailers and other such vehicular housings, of the general type disclosed herein, are well known and include a plurality of electrical, pneumatic and other such cables which extend from the back end of the trailer to the front end thereof, where they are connected to the appropriate components of a truck or other such towing vehicle. These types of cables are generally positioned below the trailer's flooring, and in the past they have extended through cooperating holes provided in a plurality of transversely extending steel I-beams which comprise a part of the trailer's lower frame. Because this type of arrangement requires a large number of such holes in the I-beams, it is quite costly and therefore unsatisfactory. More recently, the prior art has disclosed the utilization of a substantially rectangular channel housing formed with the trailer's flooring for receiving the various cables. However, this, too, has been found to be unsatisfactory, since it requires special, highly expensive flooring material.

Accordingly, a general object of the present invention is to provide a new and improved floor assembly for use in a trailer or other such vehicle, which assembly is simple in design and economical to manufacture.

A more particular object of the present invention is to provide a new and improved channeled housing adapted for complementary fitting with and between a pair of standard shiplap board sections which make up part of the flooring of a trailer or other such vehicle, the channeled housing being further adapted to receive and carry a plurality of various types of cables provided with the trailer.

Another object of the present invention is to provide a channeled housing of the above stated type, which provides easy access to the aforesaid cables, whereby to facilitate maintenance thereof.

These and other objects and features of the present invention will become more apparent upon a consideration of the following descriptions.

BRIEF DESCRIPTION OF THE DRAWINGS

In the drawings:

FIG. 1 is a partially broken away perspective view of a trailer or other such vehicular housing utilizing a floor assembly constructed in accordance with the present invention, the trailer being illustrated partially in solid lines and partially in dotted lines;

FIG. 2 is a side sectional view of the trailer's lower section, taken generally along line 2—2 in FIG. 1;

FIG. 3 is an enlarged broken away perspective view of the trailer's floor assembly, taken generally along line 3—3 in FIG. 2; and FIG. 4 is an enlarged sectional view taken generally along line 4—4 in FIG. 2 and particularly illustrating the channeled housing which comprises part of the aforementioned floor assembly, and which is constructed in accordance with the present invention.

DETAILED DESCRIPTION

Turning to the drawings, wherein like components are designated by like reference numerals throughout the various figures, a floor assembly 10, constructed in accordance with the present invention, is provided with a trailer or other such vehicular housing 12 which is illustrated partially by solid lines and partially by dotted lines in FIG. 1. The trailer per se, with the exception of floor assembly 10, is of a known kind and includes a substantially rectangular elongated housing portion 14 defined by side walls 16, end walls 18 and top wall 20. The housing portion and floor assembly are mounted to a rectangular lower frame assembly 22, to be described hereinafter, which in turn is supported by a wheel assembly 24 at the rearward end thereof. A trailer hitch (not shown) extends from the forward end 26 of the trailer and is mounted to the front transverse side of the frame assembly for connecting the trailer to a towing vehicle (not shown).

As illustrated in FIGS. 1 and 2, lower frame assembly 22 comprises a pair of longitudinally extending and laterally spaced side plates or sections 30 which are suitably joined at their common opposite ends by transversely extending and elongated end plates or sections 32 for thereby defining a substantially rectangular frame. A plurality of longitudinally spaced elongated transverse beams 34, preferably steel I-beams, are suitably fastened at common opposite ends, to the two side sections 30, respectively, for defining longitudinally spaced openings 36. A rectangular plate 38, suitably mounted to the forward end of frame assembly 22 on the bottom surface thereof, substantially completely closes off the forwardmost opening 36 from the ground, this being typical of most conventional trailers.

In accordance with the present invention, floor assembly 10, which is illustrated best in FIG. 3, comprises a first elongated floor section 40, a laterally spaced second elongated floor section 42 and an elongated channeled housing 45 held between floor sections 40 and 42. Each of the floor sections comprises a plurality of elongated standard shiplap floor boards 44 interfitted in side-by-side relationship. As is well known, each of the shiplap floor boards includes a pair of longitudinally extending channels, grooves or recesses (better known as rabbets) 46, which are cut out of diametrically opposite longitudinal corners of the floor board so that the edges of each board lap over the edges of adjacent boards to make a flush, substantially water-tight and dust-tight joint.

Turning to FIG. 4, in conjunction with FIG. 3 attention is directed to channeled housing 45 which defines an elongated inverted, substantially T-shaped channel 49 for receiving a plurality of various types of control connectors such as electrical cables 51, air hose 53, or the like, air hose 53 being used for the air brakes provided with the trailer. The housing includes an elongated inverted substantially U-shaped housing or top portion 48 defined by a rectangular elongated top plate 50, and two elongated rectangular leg portions 52 extending downwardly from and formed with the longitudinal edges of top plate 50, as illustrated in FIG. 4.

Channeled housing 45 further includes a pair of inwardly facing substantially U-shaped elongated sections 54, each of which is defined by a substantially rectangular elongated base portion 56 and integrally formed and inwardly extending rectangular upper and lower leg portions 58 and 60, respectively. Each of the upper legs of U-shaped sections 54 merge with a lower end of an associated leg portion 52, while each lower leg 60 extends inwardly and below the remainder of the channeled housing for defining an opening 62 which provides easy access to channel 49.

As illustrated in FIG. 3, each of the shiplap boards 44 comprising floor section 42 is inverted relative to the shiplap boards of section 40 so as to form a mirror image of section 40. In this manner, the otherwise free channels or recesses 46 formed with those shiplap boards 44 which are adjacent to channeled housing 45 are positioned in direct opposing lateral relationship with each other. The channeled housing is appropriately dimensioned so that U-shaped sections 54 fit snugly within these opposing recesses or channels, while the leg portions 52 of section 48 fit snugly against the inwardly extending side walls of the shiplap board, the top plate 48 of section 50 being flush with the top surface of the shiplap boards whereby to provide continuity therewith.

Returning to FIG. 1 briefly, it can be seen that floor assembly 10 is positioned directly on top of frame assembly 22 so that channeled housing 45 extends the length thereof for receiving and directing cables 51 (FIG. 3) therethrough. The channeled housing may be positioned anywhere along the floor assembly, depending upon the location of the cables relative to the trailer's siding. While a plurality of nails or other fastening devices 66 are required for mounting the floor assembly 10 to frame assembly 12, the number of such fastening nails is substantially reduced due to the interfitting relationship of the shiplap boards. In addition, the recesses in the free longitudinal edges of floor sections 40 and 42 are eliminated, so as to provide flush fittings between the floor assembly and the trailer's side walls 16.

With floor assembly 10 constructed in the aforementioned manner, it is readily apparent that there is free access to cables 64, via openings 36 in frame assembly 22 and openings 62 in channeled housing 44, in the event the cables require maintenance. While such free access is not provided in that portion of the channeled housing which extends above the forwardmost openings 36, due to plate 38, an additional substantially rectangular plate 68 is supported on inwardly extending lower legs 60 of opposite U-shaped sections 54 and extends the length of the plate 38, as illustrated in FIG. 2. In this manner, while there is not free access to the cable portions located thereat, the addition of plate 68 aids in protecting those cable portions from damage, so as to thereby reduce maintenance thereof.

It should be noted that in addition to the aforementioned advantages of floor assembly 10, a further advantage is apparent. Specifically, since shiplap boards 44 of floor section 42 are inverted relative to the shiplap boards of floor section 40, only half of the total shiplap boards need be removed in the event one thereof is damaged.

While a particular embodiment of the invention has been shown, it should be understood, of course, that the invention is not limited thereto since many modifications may be made. It is, therefore, contemplated to cover by the present application any such modifications as fall within the true spirit and scope of the appended claims.

The invention is claimed as follows:

1. A floor assembly for use in a trailer or other such vehicle which utilizes various control connectors such as cables or hoses, said assembly comprising a first plurality of interfitting individual floor sections, first longitudinal channel means for interfitting said first plurality of floor sections in side-by-side relationship, a second plurality of interfitting individual floor sections, second longitudinal channel means for interfitting said second plurality of floor sections in side-by-side relationship, said second plurality of floor sections being spaced from said first plurality of floor sections with the channel means of the adjacent floor sections facing the space therebetween being in mirror image, elongated housing means positioned between said first and second floor sections and defining a channel adapted to receive said connectors, and opposed outwardly projecting sections formed with said housing means and fitting within the facing channel means of adjacent first and second interfitting means for interfitting said housing means to said first and second floor sections.

2. A floor assembly according to claim 1 wherein said housing means is symmetrical about its longitudinal axis.

3. A floor assembly according to claim 2 wherein said floor sections are substantially identical and wherein said second plurality thereof are inverted relative to said first plurality whereby to form a mirror image of said first plurality of sections.

4. A floor assembly according to claim 3 wherein each of said floor sections comprises a standard elongated shiplap board.

5. A floor assembly according to claim 1 wherein said housing means defines an opening to said channel for providing access to said cables whereby to facilitate maintenance thereof.

6. A floor assembly according to claim 5 including plate means positioned within said housing and covering a portion of said opening whereby to protect a portion of said cables.

7. A floor assembly according to claim 1 wherein said housing means includes an elongated inverted substantially U-shaped section and wherein said projecting section formed with said housing means includes a pair of substantially U-shaped extensions formed with opposite legs of said U-shaped section and extending along the longitudinal axis of said U-shaped section, said extensions projecting outwardly from and below said U-shaped section whereby to interfit with said first and second plurality of floor sections respectively.

8. A floor assembly for use in a trailer or other such vehicle which utilizes various control connectors such as cables or hoses, said assembly comprising a first plurality of floor sections of identical elongated standard shiplap boards, first means for interfitting said first plurality of floor sections in side-by-side relationship, a second plurality of floor sections of identical elongated standard shiplap boards, second means for interfitting said second plurality of floor sections in side-by-side relationship, said second plurality of floor sections being spaced from said first plurality of floor sections and inverted relative thereto whereby to form a mirror image thereof, elongated housing means symmetrical about its longitudinal axis and positioned between said first and second floor sections and defining a channel adapted to receive said connectors, and said housing means including an elongated inverted substantially U-shaped section and a pair of substantially U-shaped extensions formed with opposite legs of said U-shaped section and extending along the longitudinal axis of said U-shaped section, said extensions projecting outwardly from and below said U-shaped section whereby to interfit with said first and second plurality of floor sections respectively.

* * * * *